US011909503B2

(12) United States Patent
Dutta et al.

(10) Patent No.: US 11,909,503 B2
(45) Date of Patent: *Feb. 20, 2024

(54) SINGLE FREQUENCY NETWORK (SFN) FOR BROADCAST/MULTICAST APPLICATION ON A SPOTBEAM SATELLITE

(71) Applicant: ATC Technologies, LLC, Reston, VA (US)

(72) Inventors: Santanu Dutta, Vienna, VA (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/387,017

(22) Filed: Jul. 28, 2021

(65) Prior Publication Data
US 2022/0038171 A1 Feb. 3, 2022

Related U.S. Application Data

(60) Provisional application No. 63/057,617, filed on Jul. 28, 2020.

(51) Int. Cl.
*H04N 7/20* (2006.01)
*H04N 7/173* (2011.01)
*H04B 7/185* (2006.01)

(52) U.S. Cl.
CPC ..... *H04B 7/18513* (2013.01); *H04B 7/18515* (2013.01)

(58) Field of Classification Search
CPC ............ H04B 7/18513; H04B 7/18523; H04B 7/18515; H04B 7/2041; H04B 7/18563; H04H 20/22; H04H 40/18
(Continued)

(56) References Cited

U.S. PATENT DOCUMENTS 7,423,585 B2 * 9/2008 Tekawy ................. G01S 19/02
342/357.395
8,705,436 B2 4/2014 Dutta
(Continued)

FOREIGN PATENT DOCUMENTS

WO WO-2020202121 A1 * 10/2020 ......... H04B 7/18513

*Primary Examiner* — Edan Orgad
*Assistant Examiner* — Vanneilian Lalchinthang
(74) *Attorney, Agent, or Firm* — Michael Best & Friedrich LLP (57) ABSTRACT

Systems and methods operating a spotbeam satellite network to provide single frequency network broadcast and multicast services. One example embodiment provides a satellite broadcast system. The system includes an electronic processor communicatively coupled to a satellite and a user equipment. The electronic processor is configured to receive a plurality of bearer signals, each bearing identical broadcast program information. The electronic processor is configured to, for each of the plurality of bearer signals, generate one of a plurality of spotbeams for transmission by the satellite within a coverage area. The user equipment is configured to receive the bearer signals from a plurality of adjacent spotbeams of the plurality of spotbeams. The user equipment is configured to constructively utilize the bearer signals received from the plurality of adjacent spotbeams to decode the program information.

18 Claims, 8 Drawing Sheets

(58) Field of Classification Search
USPC .......................................................... 370/316
See application file for complete search history.

(56) References Cited

U.S. PATENT DOCUMENTS

| | | | | |
|---|---|---|---|---|
| 10,784,954 | B2* | 9/2020 | Becker | H04B 7/0408 |
| 2002/0093451 | A1* | 7/2002 | Harmon | H04B 7/2041 |
| | | | | 455/13.3 |
| 2005/0041684 | A1* | 2/2005 | Reynolds | H04L 43/00 |
| | | | | 370/463 |
| 2007/0192805 | A1* | 8/2007 | Dutta | H04H 20/74 |
| | | | | 725/144 |
| 2007/0291865 | A1* | 12/2007 | Lanoiselee | H04L 27/2601 |
| | | | | 375/265 |
| 2008/0233952 | A1* | 9/2008 | Miller | H04B 7/2041 |
| | | | | 714/752 |
| 2010/0113053 | A1* | 5/2010 | Bienas | H04W 74/085 |
| | | | | 455/452.1 |
| 2012/0309294 | A1* | 12/2012 | Jong | H04B 7/18543 |
| | | | | 455/13.2 |
| 2014/0099879 | A1* | 4/2014 | Birks | H04H 20/24 |
| | | | | 455/3.06 |
| 2019/0132181 | A1* | 5/2019 | Yaghmour | H04B 1/1027 |
| 2019/0149228 | A1* | 5/2019 | Ziskind | G01S 19/41 |
| | | | | 455/12.1 |

* cited by examiner

Figure 1 Broadcasting over USA and Southern Canada with Single Widearea Beam

Figure 2 Blanket broadcasting over USA and Southern Canada with multiple spotbeams

SINGLE FREQUENCY NETWORK (SFN) FOR BROADCAST/MULTICAST APPLICATION ON A SPOTBEAM SATELLITE

CROSS-REFERENCE TO RELATED APPLICATIONS

The present application is related to and claims benefit under 35 U.S.C. § 119(e) from U.S. Provisional Patent Application Ser. No. 63/057,617, filed Jul. 28, 2020, entitled "Single Frequency Network (SFN) for Broadcast/Multicast application on a Spotbeam Satellite," the entire contents of which being incorporated herein by reference.

FIELD

Embodiments described herein relate to wireless communications systems and, more particularly, to the use of Single Frequency Network techniques for satellite broadcast and multicast communications systems.

BACKGROUND

Wireless broadcasting is well known for television and radio content. As used herein, the term "broadcasting" means simultaneously sending the same content to multiple recipients. A distinction is sometimes made between broadcasting and multicasting, wherein broadcasting sends the content to everyone on a network, whereas multicasting sends content to a select list of recipients. As used herein, "broadcasting" is used generically to mean simultaneously sending the same content to all or a subset of all User Equipment on a network. As used herein, the term "user equipment" or "UE" includes satellite radiotelephones or data terminals, including smart telephones and access points for internet of things (IoT), wherein the terminal includes a radio frequency transceiver and may also include a global positioning system (GPS) or global navigation satellite system (GNSS) receiver. Embodiments of the systems and methods presented herein may be described herein as being applied either broadcasting or multicasting. However, it should be understood that the techniques described herein are not limited to either broadcasting or multicasting but may be applied to both.

Single-frequency broadcast networks have many advantages in terrestrial applications, such as conserving spectrum (using N=1 frequency reuse), operation with lower transmit powers, and better coverage of cluttered environments. Lower power operation is enabled by coherently combining at the User Equipment (UE) signals received from multiple transmit towers, wherein the transmit signals are synchronized. In this type of network, the signals from different towers appear to the UE as multipath components of the same signal. The rich repertoire of processing techniques available to demodulate signals in the presence of multipath can be applied. For example, orthogonal frequency-division multiplexing (OFDM) is a multipath resistant modulation technique used by Single Frequency Networks (SFNs).

Figure 1:
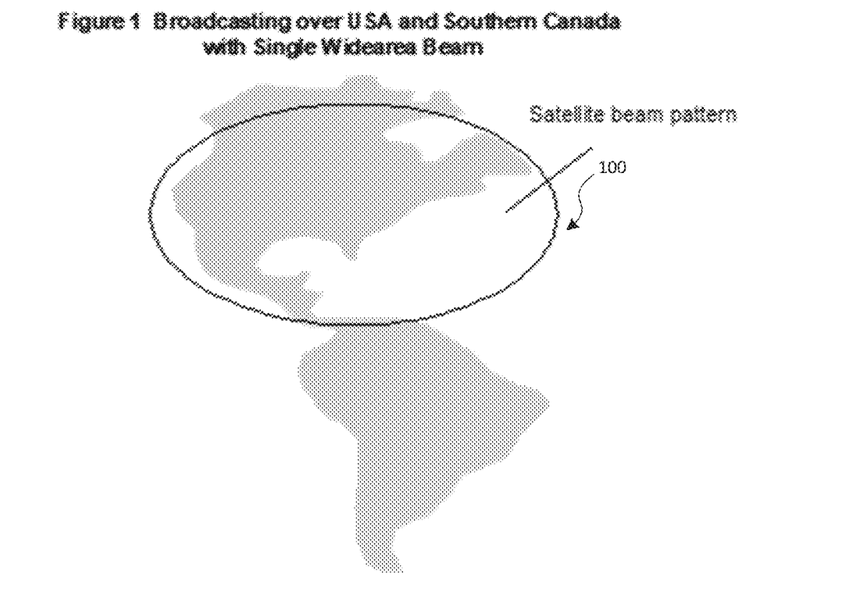
FIG. 1 illustrates a single wide area beam pattern for satellite broadcasting in North America.

There is no known prior art of SFN techniques being used for satellite broadcast. This probably for the following reasons. Given a fixed satellite coverage area, the best antenna pattern is a global beam. The beam's shape may be adjusted to match different throughput requirements in different parts of the coverage area, as has been done for SDARS (Satellite Digital Audio Radio Service) in the North America. This case is illustrated by FIG. 1, which shows a single wide area satellite beam pattern 100 covering most of North America.

Figure 2:
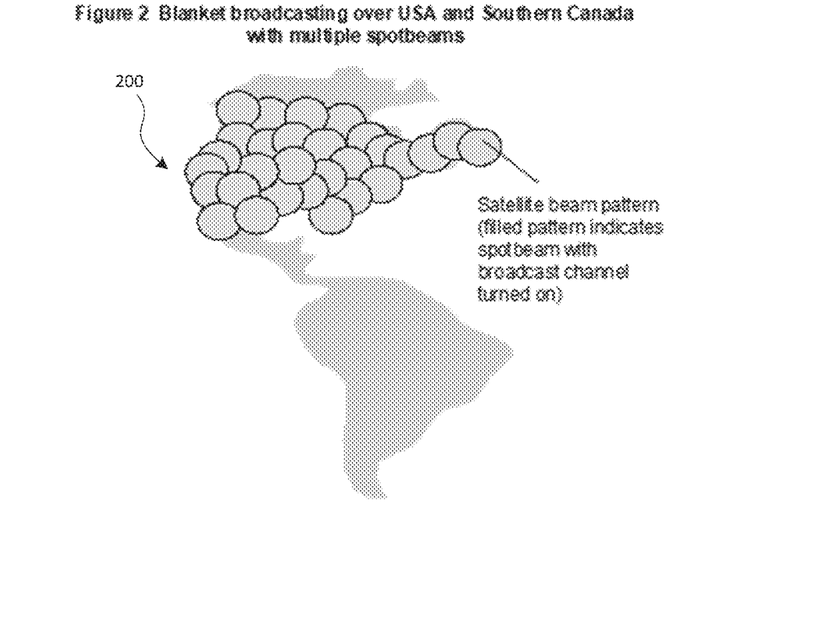
FIG. 2 illustrates multiple spotbeam pattern for satellite broadcasting in North America.

If it is desired to provide a broadcast service over a spotbeam satellite, such as Ligado's SkyTerra-1 or Inmarsat's I4, and the coverage area spans multiple beams, one of two options are used: (i) a larger beam so that the service is contained within a single beam (e.g., as illustrated in FIG. 1), or (ii) traditional multi-frequency reuse (e.g., N=3 to 7, depending on interference tolerance), with the same programming being carried on all beams. The latter case is illustrated in FIG. 2. FIG. 2 shows the use of multiple spotbeams 200 to provide substantially similar coverage as the single beam 100 of FIG. 1. However, this solution inefficiently uses both spectrum and satellite power, as the overlap between the spotbeams 200 does not contribute to usable power.

Figure 3:
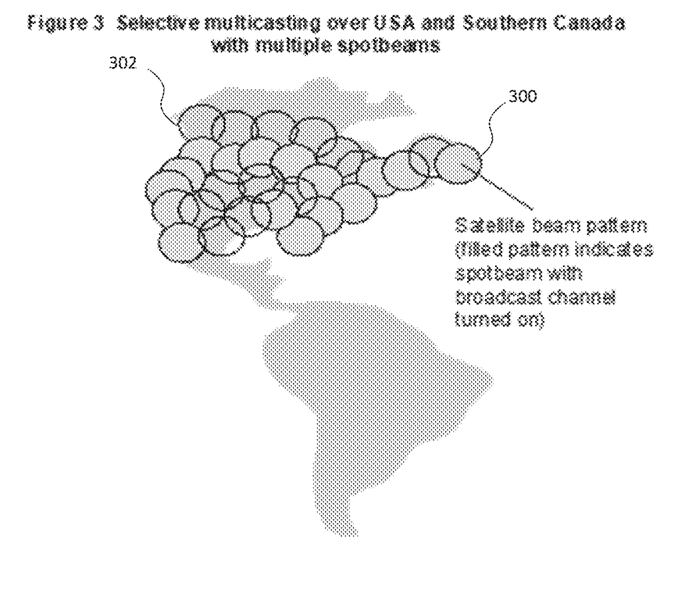
FIG. 3 illustrates multiple spotbeam pattern for satellite selective multicasting in North America.

In the case where the users of the broadcast service are non-uniformly distributed over the coverage area, and the spotbeams can be made sufficiently small to match the deployed coverage to the user distribution, it is expected that substantial savings of satellite power and bandwidth may be achieved by selectively illuminating selected spotbeams. This case is illustrated in FIG. 3. As illustrated in FIG. 3, some spotbeams 300 are illuminated, while other spotbeams 302 are not.

In FIG. 3, the illuminated spotbeams 300 use a North America-wide SFN. The spotbeam illumination is adaptive and is based on sensing the presence of a single user, or a threshold number of multiple users, requesting the service in the coverage area of the applicable spotbeams. Until such request is received by the network, the small number of users may be served by unicast delivery. This requires that a bidirectional, unicast communication link be present as an underlay to the broadcast network, and that UEs can receive the same service in unicast or broadcast mode, and switch between the two. This is currently supported in eMBMS. In such systems, an intelligent Service Manager in the infrastructure receives the users' service requests and manages the spotbeam illumination.

SUMMARY

Embodiments of the present invention provide for the use of Single Frequency Network techniques for satellite broadcast and multicast communications systems. Using embodiments presented herein, multiple spotbeams on the same frequency are generated for a coverage area. User equipment receiving multiple bearer signals from adjacent beams are able to constructively utilize the bearer signals. Differential delays, selectively introduced into the bearer signals, enable the receiving user equipment to optimally combine the signals received from different beams. As described herein, differential delays are chosen to improve reception of the combined signal at the user equipment. Using such embodiments, a spotbeam satellite can provide broadcast services over a larger coverage area while more efficiently using spectrum and satellite power.

One example embodiment provides a method for operating a satellite network to broadcast a plurality of spotbeams within a coverage area. The method includes receiving, with a user equipment, bearer signals from a plurality of adjacent spotbeams of the plurality of spotbeams. Each of the plurality of spotbeams carries a bearer signal bearing identical broadcast program information. The method includes constructively utilizing, with the user equipment, the bearer signals received from the plurality of adjacent spotbeams to decode the program information.

Another example embodiment provides a satellite broadcast system. The system includes an electronic processor communicatively coupled to a satellite and a user equipment. The electronic processor is configured to receive a plurality of bearer signals, each bearing identical broadcast program information. The electronic processor is configured to, for each of the plurality of bearer signals, generate one of a plurality of spotbeams for transmission by the satellite within a coverage area. The user equipment is configured to receive the bearer signals from a plurality of adjacent spotbeams of the plurality of spotbeams. The user equipment is configured to constructively utilize the bearer signals received from the plurality of adjacent spotbeams to decode the program information.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

It should also be noted that a plurality of hardware and software-based devices, as well as a plurality of different structural components may be used to implement aspects of the disclosure. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics-based aspects may be implemented in software (e.g., stored on non-transitory computer-readable medium) executable by one or more electronic processors (e.g., microprocessors). As such, it should be noted that a plurality of hardware and software-based devices, as well as a plurality of different structural components may be utilized to implement the disclosure. For example, "control units" and "controllers" described in the specification can include one or more processors, one or more memory modules including non-transitory computer-readable medium, one or more input/output interfaces, and various connections (e.g., a system bus) connecting the components.

For ease of description, the example systems or devices presented herein may be illustrated with a single exemplar of each of its component parts. Some examples may not describe or illustrate all components of the systems. Other example embodiments may include more or fewer of each of the illustrated components, may combine some components, or may include additional or alternative components.

Figure 4:
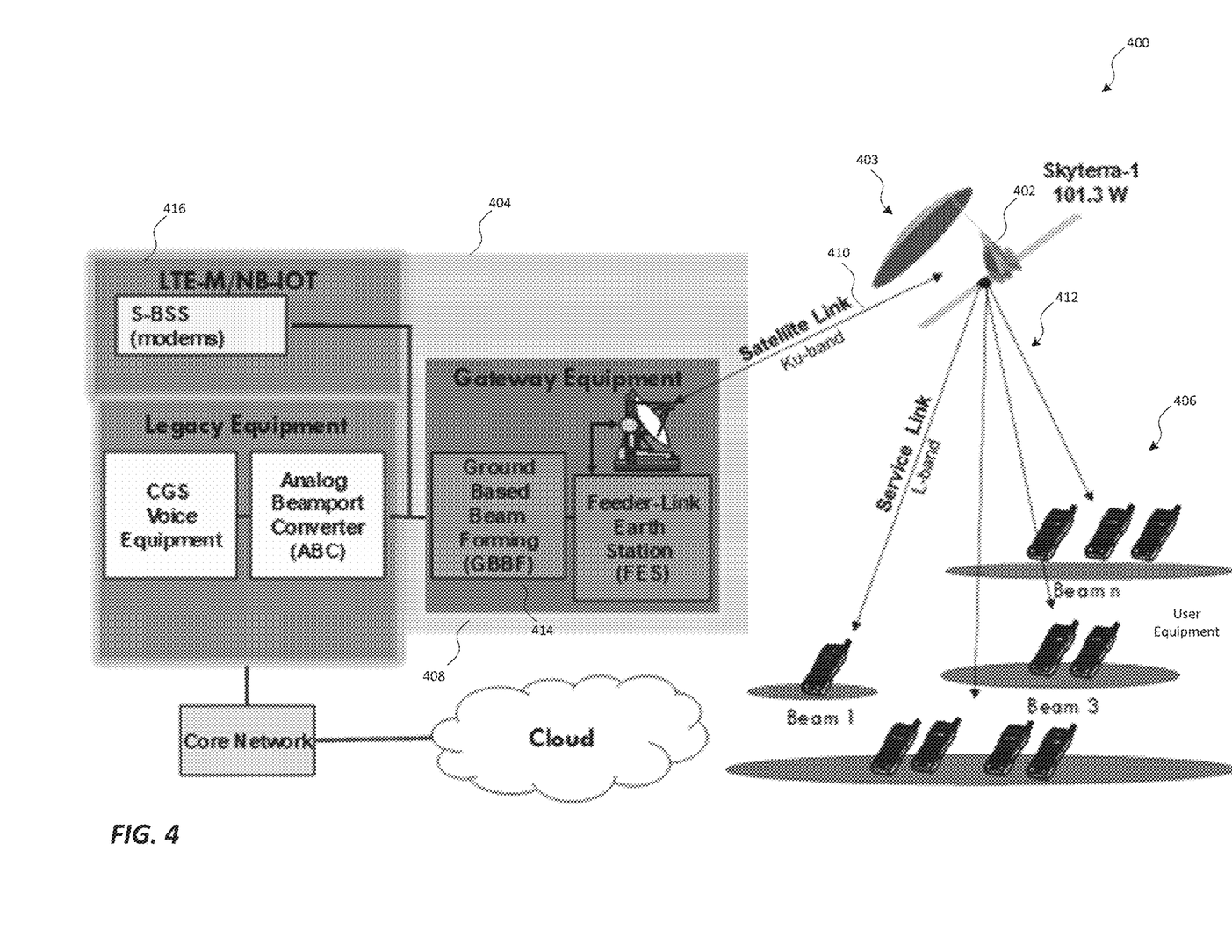
FIG. 4 illustrates a satellite network system according to some embodiments.

FIG. 4 illustrates and example satellite network 400. The satellite network 400 includes a satellite 402, a satellite earth station 404, and a plurality of user equipment 406. The satellite 402 includes electronics and equipment (e.g., an antenna array 403 and corresponding feeder electronics) configured for sending and receiving wireless communications to and from the satellite earth station 404 and a plurality of user equipment 406. For example, as illustrated in FIG. 4, the satellite 402 receives signals from the gateway equipment 408 via a Ku-band satellite link 410 and retransmits those signals to the user equipment 406 via an L-band service link 412 using the antenna array 403. As illustrated in FIG. 4, the satellite 402 transmits to the user equipment 406 using a plurality of spotbeams 1-n. The satellite earth station 404 include includes electronics and equipment configured for sending and receiving wireless communications to and from the satellite 402.

One notable feature of the satellite network 400 is that all of the beams are formed by a digital beamformer on the ground, referred to as a Ground Based Beam Former (GBBF) 414. The GBBF 414, described more particularly below with respect to FIG. 5, and the satellite 402 are air interface agnostic, i.e., transparent to the waveforms. The Satellite Base Station (S-BBS) 416 performs the RAN functions of resource scheduling and data/signal processing required by the lower layers of the protocol stack and provides bearer signals to the GBBF 414 at complex baseband. One bearer signal is provided for each L-band carrier and each beam. All bearer signals destined for a beam (e.g., different carriers separated in frequency) are added linearly and input to a beam port of the GBBF 414 corresponding to a destination beam. There may be more than one carrier per beam and more than one beam may overlay a given geographic area. The beams may have arbitrary sizes and shapes, ranging in size from a CONUS Beam covering all North America to a Small Beam (e.g., having a 150 km radius). The GBBF 414 may form over a large number of beams, but the aperture of the satellite's antenna system, which comprises an antenna array 403 of many radiating elements, limits the smallest beam size to the Small Beam mentioned above.

Figure 5:
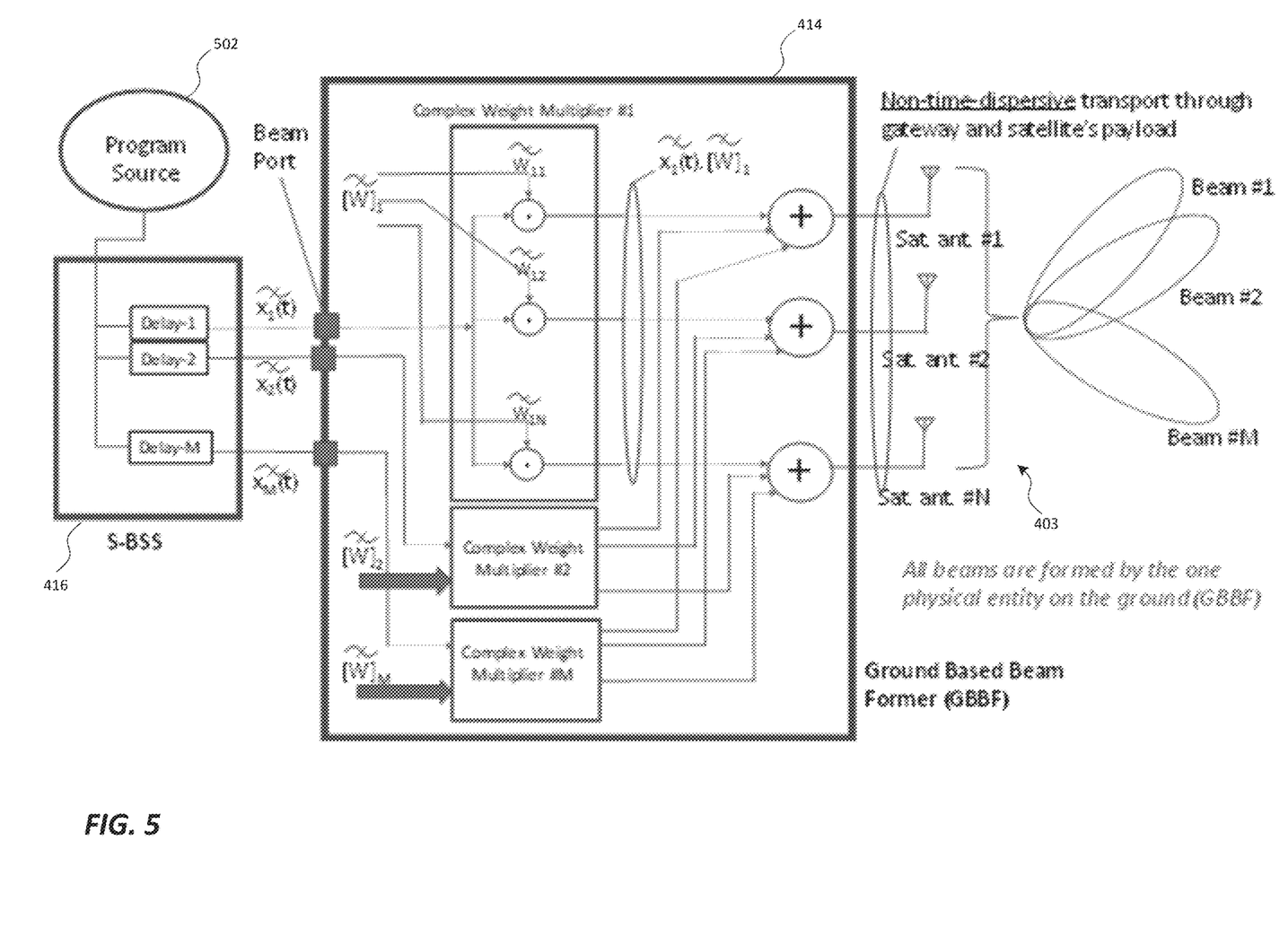
FIG. 5 illustrates a ground-based beamforming system for use with the satellite network system of FIG. 4 according to some embodiments.

FIG. 5 illustrates an example embodiment of the operation of the Ground Based Beam Former (GBBF) 414. As illustrated in FIG. 5, the S-BSS 416 receives a program signal for broadcast from a program source 502 (e.g., a digital audio or video programming provider). The S-BSS 416 processes the program signal to produce complex baseband bearer signals to the GBBF 414 for beamforming. In a broadcast application all bearer signals are identical. As illustrated in FIG. 5, the bearer signals are represented as $x_i(t)$, where i=1 to M, and $x_i(t)$ is a time varying, complex baseband signal, which is input to the i-th beam port of the GBBF 414. The GBBF 414 applies complex weights to the bearer signals to produce beams 1-M, which are fed to the satellite 102 and transmitted via the satellite antenna array 403 to user equipment on the ground.

It is relatively easy to synchronize the bearer signal in the satellite case, as they all originate from a single S-BSS. Unlike in terrestrial applications, here the problem of synchronizing physically remote base stations is absent. Nevertheless, as shown in FIG. 5, the S-BSS 416 inserts optimized, unique delays 1-M in the paths of the bearer signals for each beam. These inserted delays enable the receiving user equipment to optimally combine the signals received from different beams. The reason for this discussed further below.

The different time delays in the bearer signals occur naturally in terrestrial SFNs because of the different propagation delays from the base stations. In the embodiment presented here, they must be inserted artificially. Once that is done, signal processing methods used in the user equipment to receive terrestrial SFN signals can be substantially reused to also receive satellite SFN signals.

As discussed below, the greater the differential delay between the beams, the better the ability of a user equipment to maximize the received signal amplitude. Therefore, it is desirable to optimize the choice of the beam delays between at least the following constraints: maximum tolerable differential delay, which may depend on the numerology of the OFDM signal—cyclic prefix guard interval, which may drive the processing load of the user equipment; the minimum differential delay necessary to guarantee an objective level of signal enhancement, (i.e., maximization of the signal-to-noise-and-interference ratio (SNIR)); and conformance to delays standardized in present terrestrial broadcasting standards, as this may have ecosystemic advantages.

Figure 6:
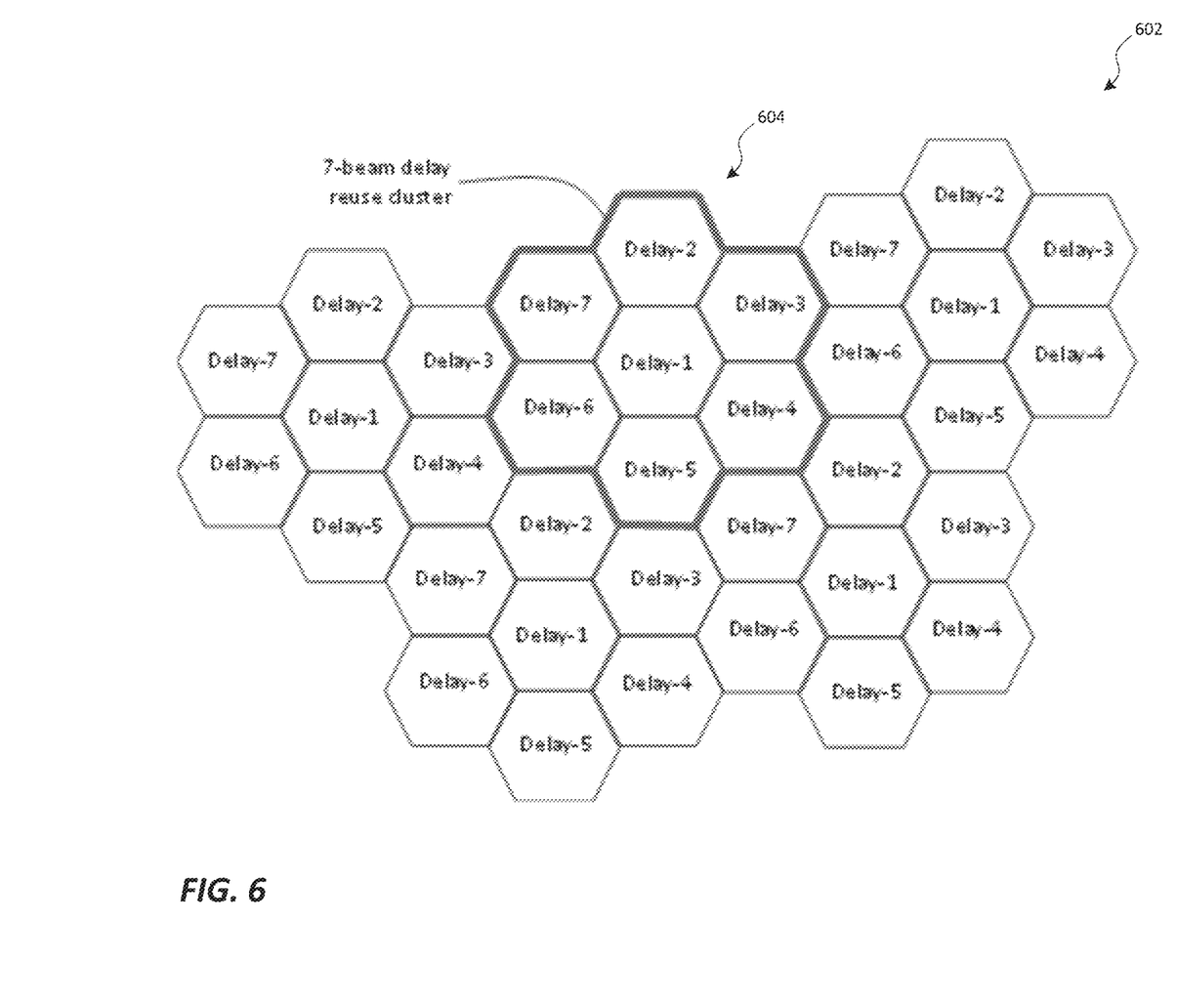
FIG. 6 illustrates a bearer signal delay reuse plan for operating the satellite network system of FIG. 4 according to some embodiments.

It is not necessary that every beam have a unique delay value. Depending on the beam's spatial selectivity, the contributions to SNIR maximization of beams that are too far apart may be de minimis. Thus, a parallel exists with frequency reuse in traditional spotbeam spectrum utilization. For example, FIG. 6 illustrates a delay reuse plan 602. The delay reuse plan is similar in concept to a frequency reuse plan. Beam delays are arranged into delay reuse clusters of adjacent beams, each with a subset of delays (e.g., delays 1-7). Each delay in the subset is used only once within a delay reuse cluster (e.g., cluster 604).

Reuse clusters may be duplicated and arranged such that the impact of the delays on SNIR maximization is more than de minimis. As an example, FIG. 6 illustrates a delay reuse cluster size of 7. As in the case of frequency reuse, the cluster size will depend on the spatial selectivity of the beam. The lower the beam selectivity, the more advantageous it will be to include more beams in a cluster. In some embodiments, a criterion for selecting the cluster size would be to include beams where ideal, coherent combination of the signals would cause at least a 1 dB increase in SNIR. That is, less than a 1 dB contribution by a beam to SNIR maximization would be considered de minimis.

It should be noted that the above teaching regarding delay reuse does not exclude embodiments with a unique delay for each beam in the entire coverage area. Such embodiments are useful, for example, in systems where the beams have relatively low selectivity.

The bearer signal delays described above introduce frequency diversity among the received signals, analogous to the way naturally occurring propagation-based delay does in terrestrial Single Frequency Networks (SFNs). This frequency diversity stems from frequency selective fading when relatively delayed copies of a broadband signal are added.

Figure 7:
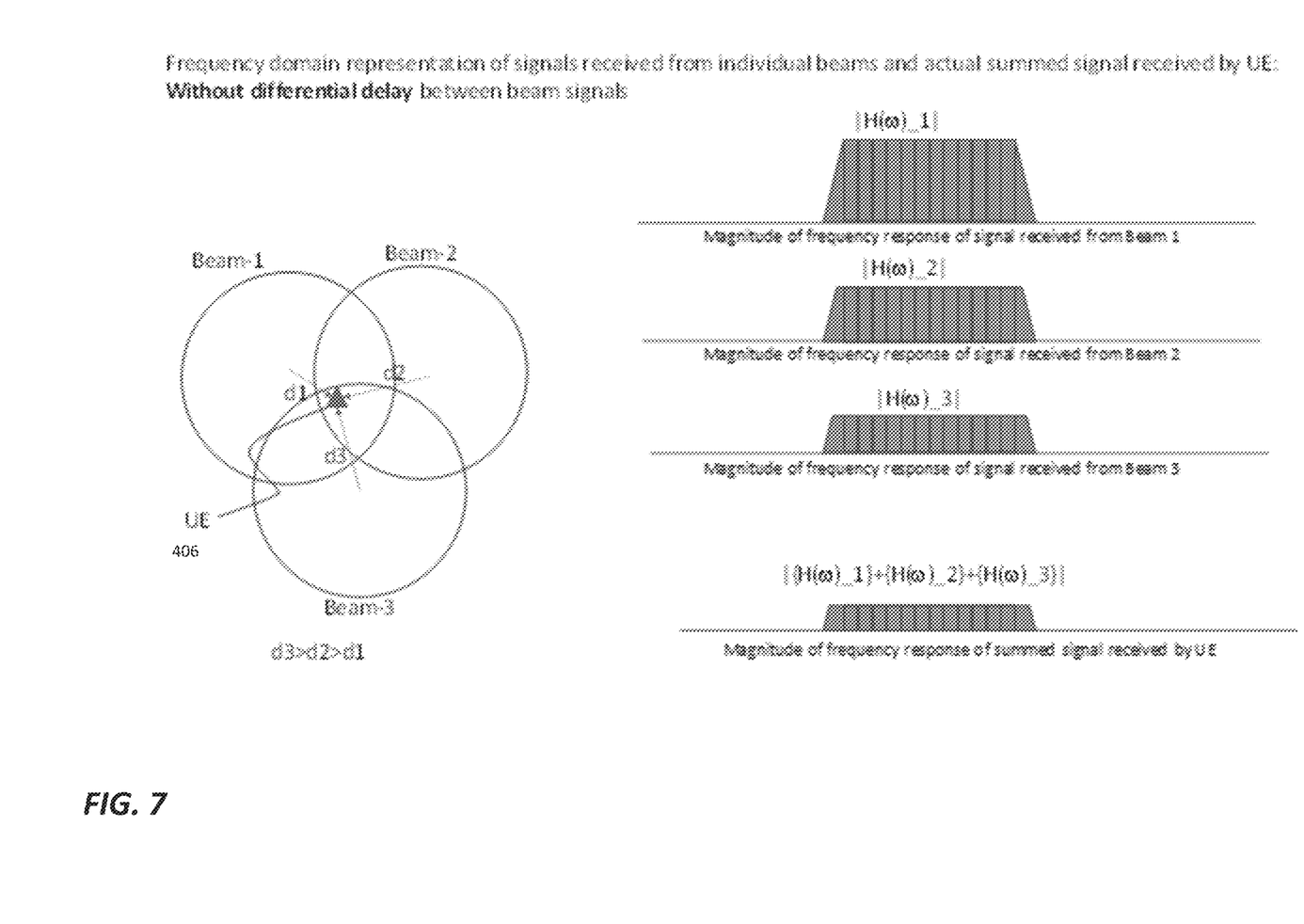
FIG. 7 illustrates aspects of the operation of the satellite network system of FIG. 4 according to some embodiments.
Figure 8:
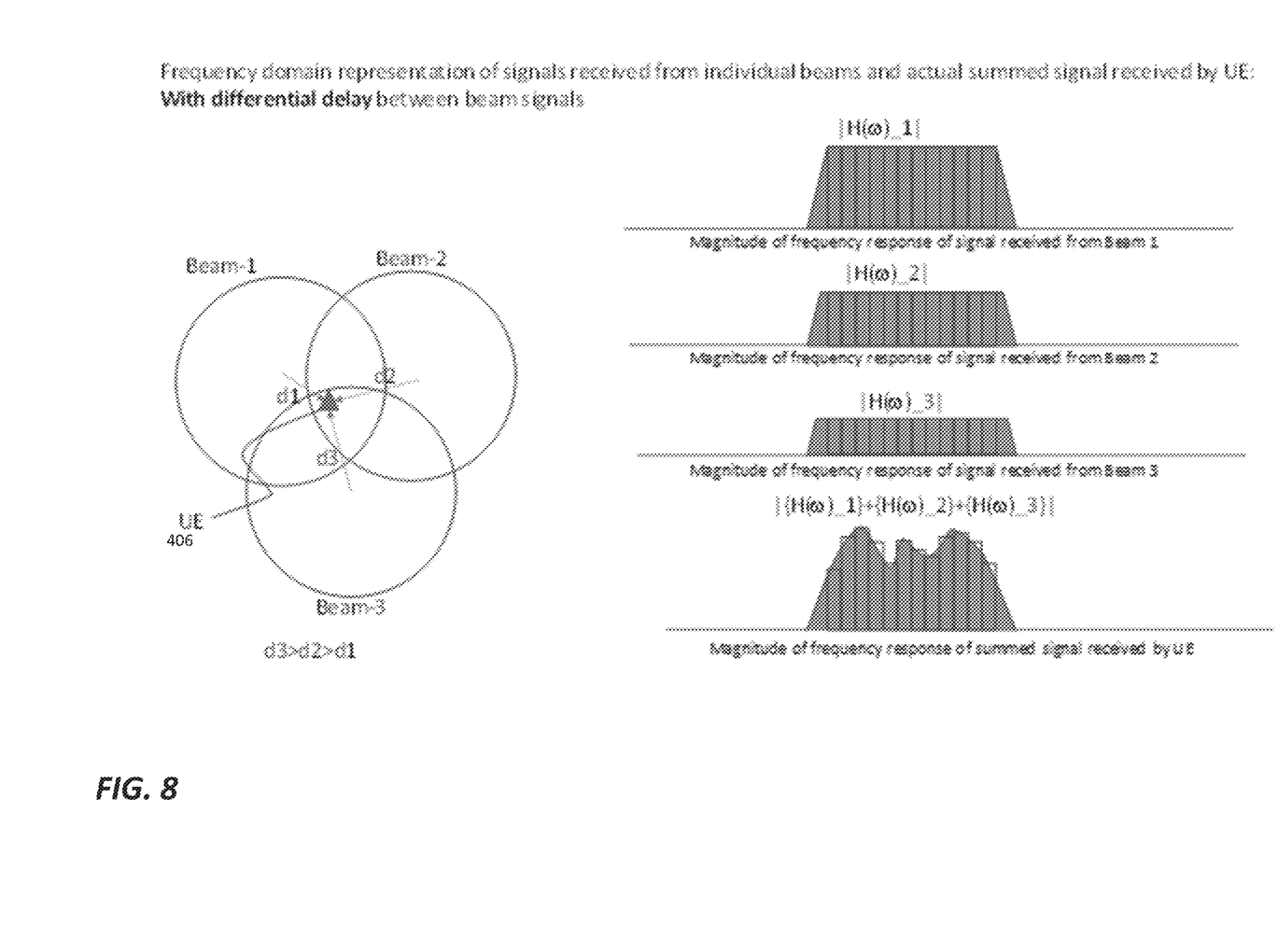
FIG. 8 illustrates aspects of the operation of the satellite network system of FIG. 4 according to some embodiments.
Figure 9:
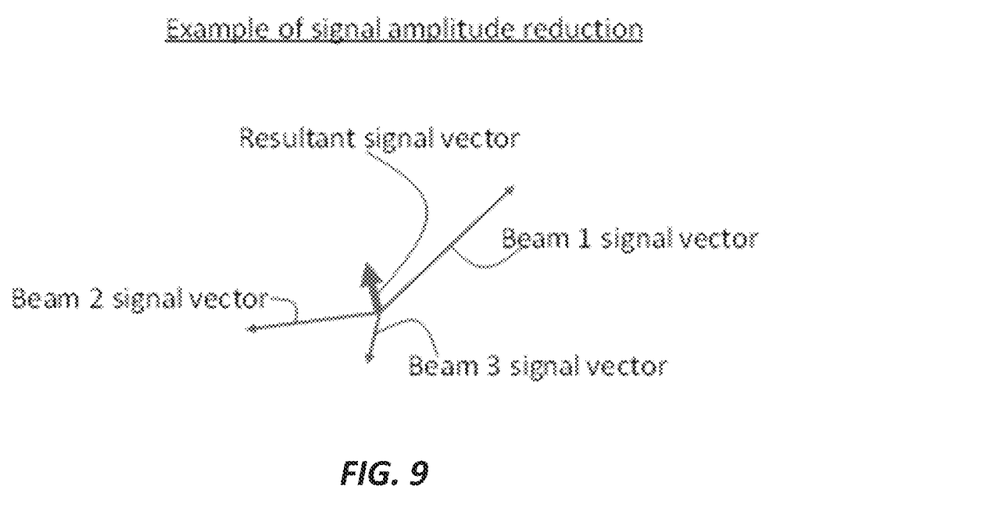
FIG. 9 illustrates aspects of the operation of the satellite network system of FIG. 4 according to some embodiments.
Figure 10:
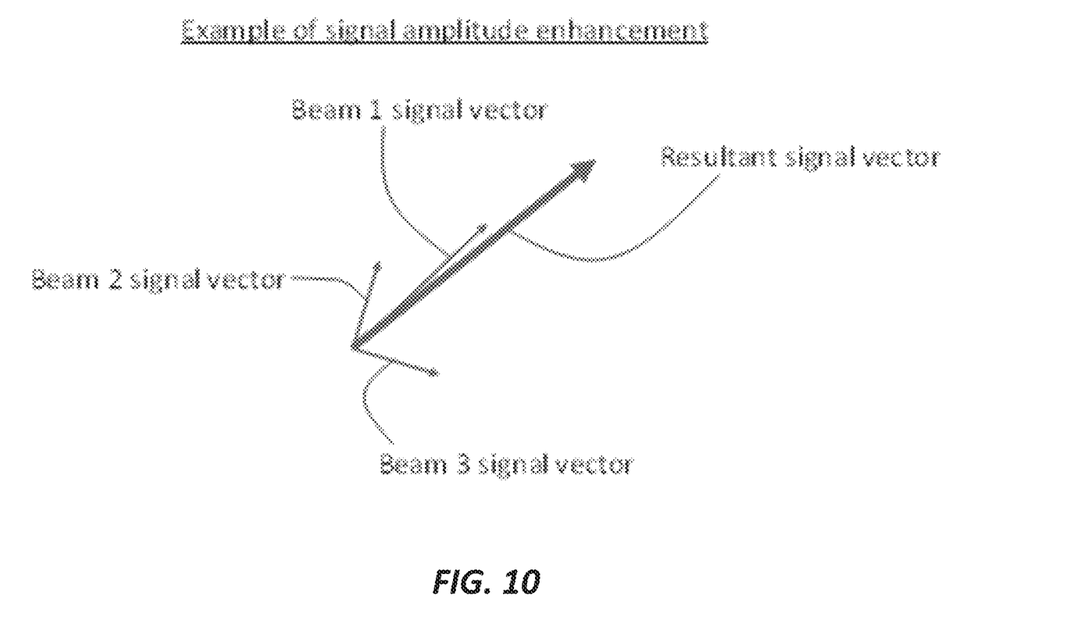
FIG. 10 illustrates aspects of the operation of the satellite network system of FIG. 4 according to some embodiments.

For example, FIGS. 7 and 8 illustrate cases where signals are received at the indicated user equipment (UE 406) location in the overlap area of three adjacent beams: Beam-1, Beam-2 and Beam-3. As illustrated in FIGS. 7 and 8, the location of the UE 406 is at distances of d1, d2 and d3 from the centers of the respective beams. The magnitude of each beam gain at the UE location is inversely proportional to the UE's distance from the beam center, and the phase of each beam signal has an arbitrary (but theoretically predictable) value. If the beam signals are synchronized (i.e., without relative delays), as illustrated in FIG. 7, they combine in the air into one received signal received by the UE 406, which signal will have a flat magnitude-spectrum, provided the spectrum of the transmitted signals is flat. The magnitude of the received signal will depend on the vector sum of the beam signals, as illustrated in FIGS. 9 and 10. This magnitude could result in signal amplitude reduction (FIG. 9) or signal amplitude enhancement (FIG. 10), depending on the UE's location with respect to the beams. If relative delays are absent (or not introduced), the same signal magnitude will exist across the entire signal bandwidth, as shown in FIG. 7. If relative delays are present (e.g., because they have been introduced by the S-BSS as described herein), as in the case of FIG. 8, the signal received by the UE 406 will add constructively at some frequencies and destructively at others, resulting in a non-uniform magnitude-spectrum.

Orthogonal frequency-division multiplexing (OFDM) signal processing techniques can make optimal use of such non-uniform spectra based on processing individual sub-bands (or sub-carriers), known as resource elements (REs), an overlaid example of which is shown in FIGS. 7 and 8. The REs are designed to be sufficiently narrowband that the fading is substantially flat within each RE, and many REs are received with an amplitude greater than would be received from any single beam. One embodiment of optimal signal processing in a frequency selective channel, suitable for OFDM, is to frequency hop a resource element over the channel bandwidth and use forward error correction to recover the transmitted information with acceptable integrity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A method for operating a satellite network to broadcast a plurality of spotbeams within a coverage area, the method comprising:
   receiving, with a user equipment, bearer signals from a plurality of adjacent spotbeams of the plurality of spotbeams, wherein each of the plurality of spotbeams carries a bearer signal bearing identical broadcast program information; and
   constructively utilizing, with the user equipment, the bearer signals received from the plurality of adjacent spotbeams to decode the identical broadcast program information;
   wherein the bearer signals transmitted in each spotbeam of the plurality of adjacent spotbeams are transmitted with a differential delay with respect to the bearer signals of each of the other spotbeams of the plurality of adjacent spotbeams, and
   wherein the choice of the differential delay is optimized relative to constraints that include at least one selected from a group consisting of: a maximization of a received signal to noise and interference ratio; a minimization of user equipment implementation complexity; and a minimization of difference from existing terrestrial broadcast/multicast standards.

2. The method of claim 1, wherein
   the plurality of adjacent spotbeams are part of a cluster of adjacent spotbeams; and
   the bearer signals transmitted in each spotbeam of the cluster are transmitted with a differential delay with respect to the bearer signals of each of the other spotbeams of the cluster.

3. The method of claim 2, wherein the differential delay of the bearer signals for each pair of beams within the cluster is unique throughout the coverage area.

4. The method of claim 2, wherein
   each differential delay within a set of differential delays for the cluster is unique within the cluster;
   the plurality of spotbeams comprises the cluster and a second cluster; and
   the plurality of spotbeams of the second cluster are transmitted using a second set of differential delays, which are identical to the set of differential delays for the cluster.

5. The method of claim 2, wherein a quantity of spotbeams making up the cluster is dependent on a spatial selectivity of the plurality of spotbeams.

6. The method of claim 5, where a criterion for including a spotbeam in the cluster is that including the spotbeam would cause at least a 1 dB increase in a signal-to-noise-and-interference ratio at the user equipment.

7. The method of claim 2, where the differential delay are introduced in a ground-based beam former.

8. The method of claim 1, wherein constructively utilizing the bearer signals includes introducing frequency redundancy in a transmitted signal such that demodulation with acceptable quality is possible even when the received signal amplitudes are relatively low in certain segments of a frequency band of the transmitted signal.

9. The method of claim 8, wherein the frequency redundancy is introduced by frequency hopping across the transmitted signal bandwidth resource blocks carrying segments of the transmitted information stream and applying error correction to recover the resource blocks containing errors.

10. A satellite broadcast system, the system comprising:
    an electronic processor communicatively coupled to a satellite and configured to
      receive a plurality of bearer signals, each bearing identical broadcast program information;
      for each of the plurality of bearer signals, generate one of a plurality of spotbeams for transmission by the satellite within a coverage area; and
      introduce into a bearer signal of each spotbeam of the plurality of spotbeams a differential delay with respect to a bearer signal of each of the other spotbeams of the plurality of spotbeams, wherein the differential delays are determined relative to constraints that include at least one selected from a group consisting of: a maximization of a received signal to noise and interference ratio; a minimization of user equipment implementation complexity; and a minimization of difference from existing terrestrial broadcast/multicast standards; and
    a user equipment configured to
      receive the plurality of bearer signals from a plurality of adjacent spotbeams of the plurality of spotbeams; and
      constructively utilize the plurality of bearer signals received from the plurality of adjacent spotbeams to decode the identical broadcast program information.

11. The system of claim 10, wherein
    the plurality of adjacent spotbeams are part of a cluster of adjacent spotbeams; and
    the electronic processor is further configured to introduce into a bearer signal of each spotbeam of the cluster a differential delay with respect to a bearer signal of each of the other spotbeams of the cluster.

12. The system of claim 11, wherein the differential delay of the plurality of bearer signals for each pair of beams within the cluster is unique throughout the coverage area.

13. The system of claim 11, wherein
    each differential delay within a set of differential delays for the cluster is unique within the cluster;
    the plurality of spotbeams comprises the cluster and a second cluster; and
    the electronic processor is further configured to introduce into the plurality of spotbeams of the second cluster a second set of differential delays, which are identical to the set of differential delays for the cluster.

14. The system of claim 11, wherein the electronic processor is further configured to determine the quantity of spotbeams making up the cluster based on a spatial selectivity of the plurality of spotbeams.

15. The system of claim 14, wherein the electronic processor is further configured to include a spotbeam in the cluster when including the spotbeam would cause at least a 1 dB increase in the signal-to-noise-and-interference ratio at the user equipment.

16. The system of claim 11, where the electronic processor is included in a ground-based beam former.

17. The system of claim 10, wherein the user equipment is configured to constructively utilize the plurality of bearer signals by introducing frequency redundancy in a transmitted signal such that demodulation with acceptable quality is possible even when the received signal amplitudes are relatively low in certain segments of a frequency band of the transmitted signal.

18. The system of claim 17, wherein the frequency redundancy is introduced by frequency hopping across the transmitted signal bandwidth resource blocks carrying segments of the transmitted information stream and applying error correction to recover the resource blocks containing errors.

* * * * *